US010783397B2

(12) United States Patent
Jain

(10) Patent No.: US 10,783,397 B2
(45) Date of Patent: Sep. 22, 2020

(54) NETWORK EDGE DEVICE WITH IMAGE THRESHOLDING

(71) Applicant: Intel Corporation, Santa Clara, CA (US)

(72) Inventor: Sandeep K. Jain, Portland, OR (US)

(73) Assignee: Intel Corporation, Santa Clara, CA (US)

(*) Notice: Subject to any disclaimer, the term of this patent is extended or adjusted under 35 U.S.C. 154(b) by 357 days.

(21) Appl. No.: 15/197,341

(22) Filed: Jun. 29, 2016

(65) Prior Publication Data

US 2018/0005076 A1 Jan. 4, 2018

(51) Int. Cl.
*G06K 9/62* (2006.01)
*G06K 9/00* (2006.01)
*H04L 29/08* (2006.01)
*G06K 9/20* (2006.01)
*G08B 21/18* (2006.01)

(52) U.S. Cl.
CPC ....... *G06K 9/6202* (2013.01); *G06K 9/00771* (2013.01); *G06K 9/20* (2013.01); *G08B 21/182* (2013.01); *H04L 67/12* (2013.01); *G06K 2207/1012* (2013.01)

(58) Field of Classification Search
None
See application file for complete search history.

(56) References Cited

U.S. PATENT DOCUMENTS

| 8,090,817 B2 * | 1/2012 | Fowler .................. H04L 69/329 700/80 |
| 2004/0016870 A1 | 1/2004 | Pawlicki et al. |
| 2004/0163102 A1 * | 8/2004 | Fowler ................ H04L 12/2825 725/12 |
| 2005/0025357 A1 * | 2/2005 | Landwehr ............. A01M 1/026 382/170 |
| 2005/0074140 A1 * | 4/2005 | Grasso ...................... G06T 5/00 382/103 |
| 2005/0280707 A1 | 12/2005 | Sablak et al. |
| 2006/0256195 A1 | 11/2006 | Ogawa |
| 2007/0273765 A1 | 11/2007 | Wang et al. |
| 2008/0106636 A1 | 5/2008 | Wernersson |

(Continued)

OTHER PUBLICATIONS

International Search Report and Written Opinion dated Aug. 29, 2017 for International Application No. PCT/US2017/035215, 13 pages.
U.S. Appl. No. 15/197,239, filed Jun. 29, 2016, and entitled "Methods and Apparatus to Perform Remote Monitoring".
Office Action dated Aug. 6, 2019 for U.S. Appl. No. 15/197,239, 60 pages.

(Continued)

*Primary Examiner* — Nancy Bitar
(74) *Attorney, Agent, or Firm* — Schwabe, Williamson & Wyatt, P.C.

(57) ABSTRACT

Methods, systems, and storage media for image thresholding at a network edge device are disclosed herein. In an embodiment, a network edge device may include a camera to be operated by at least one of the one or more processors to capture a monitoring image of a condition proximal to the device at a location. An image threshold module may be operated by at least one of the one or more processors to determine if the monitoring image exceeds a threshold relating to the condition at the location. A communication module may communicate to a remote network location an indication if the monitoring image exceeds the threshold relating to the condition.

15 Claims, 4 Drawing Sheets

(56) References Cited

U.S. PATENT DOCUMENTS

| | | | |
|---|---|---|---|
| 2008/0165861 A1* | 7/2008 | Wen | H04N 19/139 |
| | | | 375/240.26 |
| 2010/0124274 A1* | 5/2010 | Cheok | H04N 19/176 |
| | | | 375/240.03 |
| 2014/0223553 A1 | 8/2014 | Gupta et al. | |
| 2015/0130935 A1* | 5/2015 | Siann | H04N 21/44227 |
| | | | 348/143 |
| 2015/0248755 A1 | 9/2015 | Vagman et al. | |
| 2016/0044558 A1 | 2/2016 | Fukada et al. | |
| 2016/0132052 A1 | 5/2016 | Seydoux et al. | |
| 2016/0379074 A1* | 12/2016 | Nielsen | G06K 9/3241 |
| | | | 348/143 |
| 2018/0027795 A1* | 2/2018 | Janet | A01M 1/026 |
| 2019/0035091 A1* | 1/2019 | Bi | G06K 9/00751 |

OTHER PUBLICATIONS

International Search Report and Written Opinion dated Aug. 24, 2017 for International Application No. PCT/US2017/034266, 14 pages.

Crossbow, "Imote 2 High-Performance Wirless Sensor Netwok Node", Document Part No. 6020-0117-02 Rev A, <www.xbow.com>, 2016 (3 pages).

Hengstler et al., "MeshEye: A Hybrid-Resolution Smart Camera Mote for Application in Distributed Intelligent Surveillance", In Proceedings of the 6th International Conference on Information Processing in Sensor Networks, Apr. 2007, 10 pages.

International Preliminary Report on Patentability dated Jan. 1, 2019 for International Application No. PCT/US2017/034266, 9 pages.

\* cited by examiner

NETWORK EDGE DEVICE WITH IMAGE THRESHOLDING

FIELD

The present disclosure relates to the field of Internet of Things ("IoT"), and in particular, to apparatuses, methods and storage media associated with network devices that may provide image processing at an edge of a network.

BACKGROUND

The Internet of Things ("IoT") is a network of objects or "things", each of which may be embedded with hardware and/or software that may enable connectivity to the Internet. An object, device, sensor, or "thing" (also referred to as an "IoT device") that is connected to a network typically provides information to a manufacturer, operator, or other connected devices or clients in order to track information from or about the object or to obtain or provide services. IoT devices may be deployed in homes, offices, manufacturing facilities, and the natural environment. Some IoT devices may obtain images that may be sent to network location, such as a gateway, a server, or some other computer, to be processed and or monitored. Based in part on the potential numbers of IoT devices, images obtained and sent by such IoT devices may employ significant bandwidth and/or processing resources of the network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
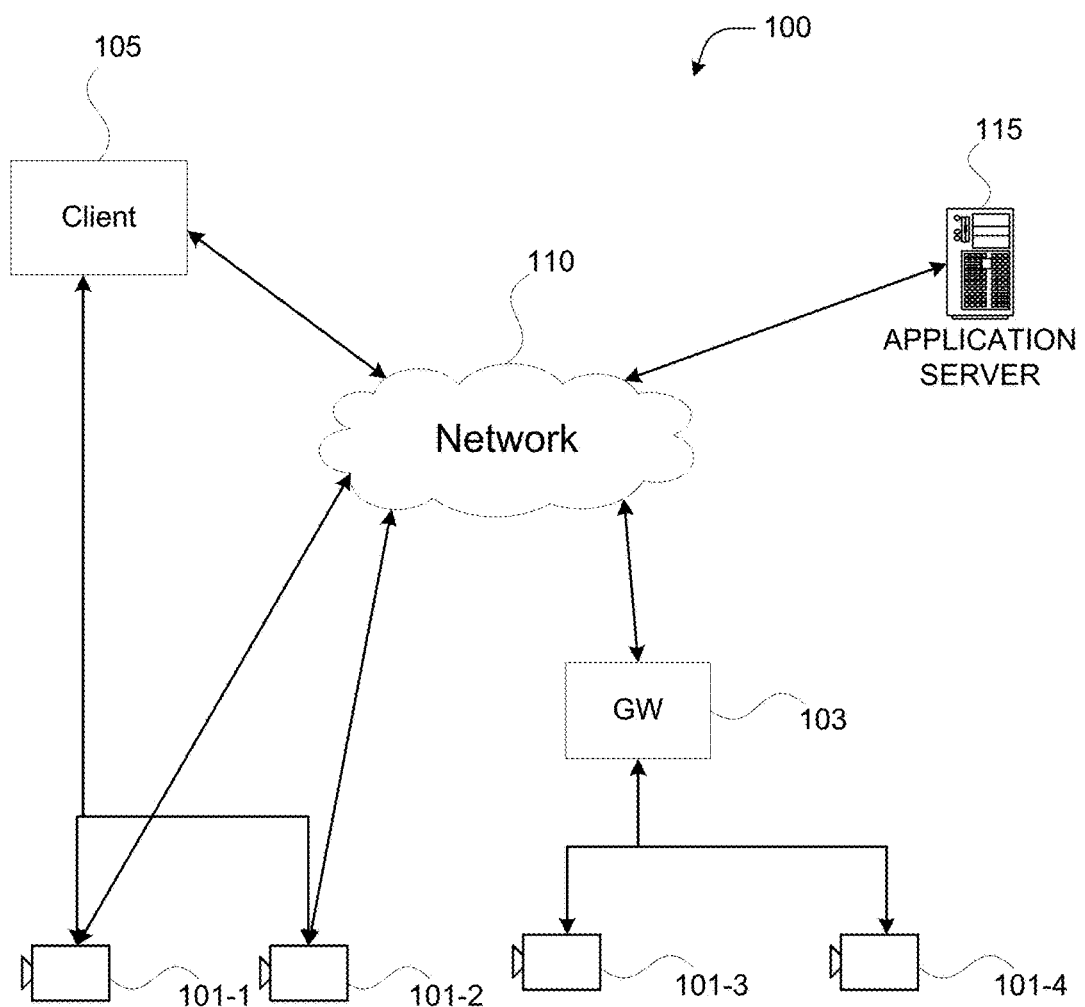
FIG. 1 illustrates a communications network in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include any or any combination of an Application Specific Integrated Circuit (ASIC), an electronic circuit, a processor (shared, dedicated, or group) or memory (shared, dedicated, or group) that execute one or more software or firmware programs, a combinational logic circuit, or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

Example embodiments disclosed herein include systems and methods relating to operation of devices that may collect, process, and transmit data. Such devices may sometimes be referred to as "Internet of Things" (IoT) devices. It should be noted that objects, sensors, or other like devices that are part of the IoT may be referred to as "IoT devices", "smart objects", "smart devices", and the like. The IoT is a network of objects that may be embedded with hardware and/or software components that may enable the objects to communicate over a communications network (e.g., the Internet). Because the IoT devices are enabled to communicate over a network, the IoT devices may exchange event-based data with service providers in order to enhance or complement the services provided by the service providers. These IoT devices are typically able to transmit data autonomously or with little to no user intervention.

FIG. 1 shows a computer network 100 in accordance with various embodiments as an operating environment. As shown in FIG. 1, computer network 100 may include network edge devices 101-1 to 101-4 (collectively referred to as "devices 101"), gateway (GW) 103, client device 105, communications network 110, and application server 115, coupled with each other as shown. Network edge devices 101 may operate at and communicate from an edge of network 100 and generally may provide a source of access into network 100. Devices 101 may include and/or operate as IoT devices.

In general, devices 101 may be any object, device, sensor, or "thing" that is embedded with hardware and/or software components that enable the object, device, sensor, or "thing" to communicate with another device (e.g., client device 105, application server 115, another device 101, etc.) over a network (e.g., network 110) with little or no user intervention. In this regard, devices 101 may include a transmitter/receiver (or alternatively, a transceiver), one or more memory devices, and/or one or more processors. Furthermore, devices 101 may be embedded with or otherwise include a transmitter or other like device that broadcasts an identification signal. In various embodiments, the identification signal may be a radio-based signal, such as a Wi-Fi signal, Bluetooth Low Energy (BLE) signal, an active radio-frequency identification (RFID) signal, an infrared signal, and the like.

According to various embodiments, the identification signal may comprise one or more data packets or data frames, where the data packets or data frames include a unique identifier associated with the device 101 transmitting the identification signal. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information.

In embodiments described below, a device 101 may include at least one camera that may be employed to automatically obtain one or more images that may be analyzed at the device 101 to obtain or identify information that may be provided to a destination on network 100 such as, for example, client device 105 and/or application server 115. The one or more images may include or relate to one or more conditions at a location or place where device 101 is located. In embodiments, the one or more conditions may relate to one or more foreign objects at the location and may include an agricultural condition or pest (e.g., insects) at an agricultural facility, such as a farm, or one or more conditions or foreign objects at or within a home or a building, or one or more conditions at an industrial facility or relating to an industrial process. As examples, foreign objects other than agricultural pests may include dust or other accumulations on solar panels or litter or other debris at a commercial or public facility.

Obtaining or identifying information at the device 101 from the one or more images may significantly reduce bandwidth and other system resources, such as power, that may otherwise be required to periodically transmit images from device 101 to client device 105 and/or application server 115 for identification of the information. In the absence of obtaining or identifying information at the device 101 from the one or more images, multiple complete images may need to be sent from a device 101, which may significantly increase use of bandwidth and other system resources. In embodiments that may not include a wired power source such as in the field of an agricultural facility, for example, reducing system resource requirements such as power may provide significant improvements in operation or functionality of device 101.

Once an image is obtained and processed by a device 101 to obtain information from the image, the information may be relayed through the network 110 and reported to a service provider (e.g., an operator of the client device 105 and/or application server 115) and/or another one of the devices 101. The service provider, a user of the client device, or the client device itself, for example, may take an appropriate action based on the information. In various embodiments, device 101 may connect with or otherwise communicate with the client device 105 via a direct wireless connection. In such embodiments, the information may report to the client device 105 without being relayed through the network 110. It should be noted that some devices 101 may be configured to report data on a periodic or cyclical basis, or based on a desired event that is captured and recorded by an IoT device 101.

GW 103 may be a network element configured to provide communication services to IoT or network edge devices (e.g., devices 101) and/or client devices (e.g., client device 105) operating within a computer network (e.g., an enterprise private network, virtual private network, local area network (LAN), a virtual local area network (VLAN), and/or any other like computer network). The GW 103 may be a wired or wireless access point, a router, a switch, a hub, and/or any other like network device that allows computing devices to connect to a network.

The GW 103 may include one or more processors, a network interface, one or more transmitters/receivers connected to one or more antennas, and a computer readable medium. The one or more transmitters/receivers may be configured to transmit/receive data signals to/from one or more IoT devices 101 and/or client device 105. The GW 103 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The GW 103 may employ one or more network interfaces in order to allow IoT devices 101 and/or client device 105 to connect to network 110, such as Ethernet, Fibre Channel, G.hn or ITU-T, 802.11 or Wi-Fi, Bluetooth, and/or any other like network connection interfaces.

According to various embodiments, the GW 103 may act as a central hub for one or more devices 101 (e.g., device 101-3 and device 101-4 as shown in FIG. 1). In such embodiments, GW 103 may be a part of a private IoT network that is operated by a single service provider, IoT device manufacturer, and/or any other like entity. In embodiments where GW 103 is a hub for devices 101 that are included in a private IoT network, GW 103 may connect the devices 101 in the private IoT network to the network 110 and/or client device 105. As shown in FIG. 1, GW 105 is connected to IoT devices 101-3 and 101-4, and thus, GW 103 may enable IoT devices 101-3 and 101-4 to provide services or information to client device 105 via network 110. However, in various embodiments client device 105 may directly connect with GW 103, such that GW 103 may enable IoT devices 101-3 and 101-4 to provide services or information to client device 105 via the direct connection.

Network 110 may be any network that allows computers to exchange data. Network 110 may include one or more network elements (not shown) capable of physically or logically connecting computers. The network 110 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

In embodiments, client device 105 and/or application server 115 may include a condition monitoring system to monitor or receive information provided by device 101. In general, client device 105 and application server 115 each may be a hardware computing device that may include one or more systems and/or applications for providing one or more services. Client device 105 and application server 115 each may include a processor, memory or computer readable storage medium, and a network interface. Additionally, client device 105 and application server 115 may each be a single physical hardware device, or may be physically or logically connected with other network devices, so as to reside on one or more physical hardware devices. Furthermore, client device 105 and application server 115 each may be connected to, or otherwise associated with one or more data storage devices (not shown). The application server 115 may be any device capable of receiving and responding to requests from one or more client devices (e.g., client device 105) across a computer network (e.g., network 110) to provide one or more services client device 105.

In some embodiments, the application server 115 may provide IoT device services, and may be able to generate content such as text, graphics, audio and/or video to be transferred to client device 105, via a Web server (not shown) in the form of HTML, XML, and/or any other appropriate structured language. The handling of requests and responses, (e.g., requests for item information and the information provided in response), as well as the delivery of content between the IoT devices 101, the application server 115, and the client device 105 may be handled by the Web server (not shown). Furthermore, it should be understood that the application server 115 may not be required and the applications and software components discussed herein may be executed on any appropriate device or host machine. The application server 115 may include an operating system that may provide executable program instructions for the general administration and operation of application server 115, and may include a computer-readable medium storing instructions that, when executed by a processor of the application server 115, may allow the application server 115 to perform its intended functions. Suitable implementations for the operating system and general functionality of the servers are known or commercially available, and are readily implemented by persons having ordinary skill in the art, particularly in light of the disclosure herein.

In FIG. 1, only four devices 101, one GW 103, one client device 105, and a single application server 115 are shown. According to various embodiments, any number of devices, any number of gateways, any number of client devices, any number of servers, and/or any number of databases (not shown) may be present. Additionally, in some embodiments, application server 115 may be virtual machines, and/or they may be provided as part of a cloud computing service. In various embodiments, application server 115 may reside on one physical hardware device, and/or may be otherwise fully integrated with one another. Thus, the depiction of the illustrative computer network 100 in FIG. 1 should be taken as being illustrative in nature, and not limited to the scope of the disclosure.

Figure 2:
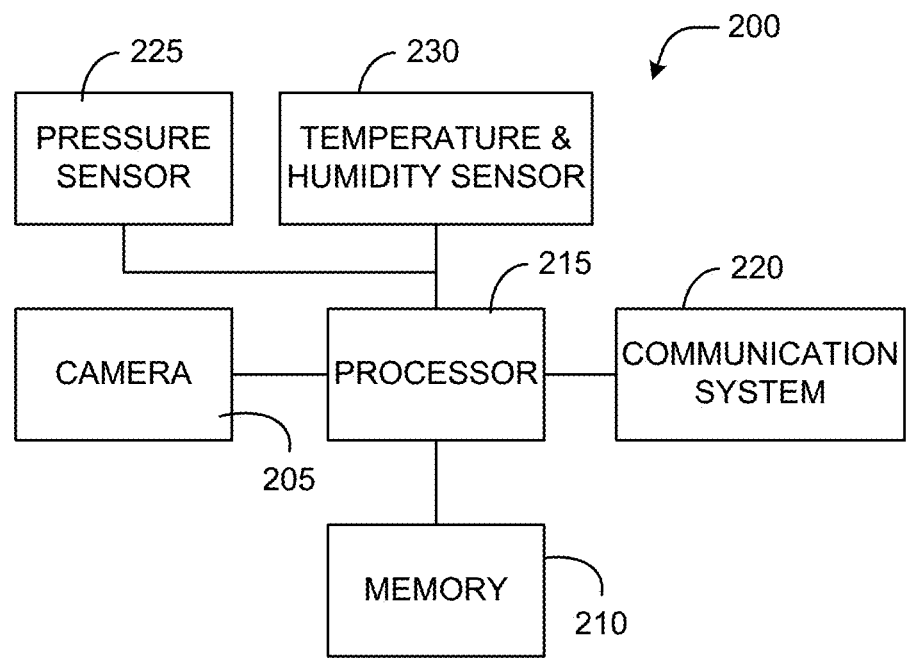
FIG. 2 is a block diagram of an embodiment of a monitoring apparatus or device that may operate as a network edge device.

FIG. 2 is a block diagram of an embodiment of a monitoring apparatus or device 200 that may operate as a network edge device, such as one of devices 101, to automatically obtain one or more images that may be analyzed at the device 200 to obtain or identify information that may be provided to a destination on network 100. As a result, device 200 may also be referred to as network edge analytics device 200. Monitoring device 200 may include a camera 205, a memory 210, and a processor 215 to execute instructions stored on memory 210. In embodiments, processor 215 may be or include a low-power microcontroller (e.g., 100 MHz microcontroller with 64 kB SRAM), and memory 210 may be and/or include flash memory circuitry (e.g., 1 MB).

Monitoring device 200 may also include a communication system 220, which may be or include components for wireless communication, and one or more sensors 225 and 230 (two shown, for example) to obtain additional information about the place where device 200 may be located. In embodiments, communication system 220 may operate in accordance with a Bluetooth Low Energy standard and/or IEEE 802.15.5/Zigbee format, and may provide communication between device 200 and a GW 103. Sensors 225 and 230 may detect environmental conditions. For example, sensor 225 may detect atmospheric air pressure and sensor 230 may detect temperature and/or humidity. It will be appreciated that in other embodiments other sensors and/or could detect other conditions that may not relate to environmental conditions. For example, other sensors could detect conditions of particular systems or conditions relating to a place or industrial operation and may include status of doors and/or windows being opened or closed, industrial process conditions, etc. In embodiments, monitoring device 200 may provide remote monitoring of one or more conditions, including image-based conditions. In some embodiments, device 200 may include and be powered by a photovoltaic solar cell and a battery (not shown), and in other embodiments device 200 may be connected to and powered by a wired power supply). In embodiments, camera 205 and memory 210 may communicate with processor 215 over a serial peripheral interface (SPI) bus, sensors 225 and 250 may communicate with processor over an Inter-Integrated Circuit (I2C) bus, and communication system 220 may communicate with processor 215 over a universal asynchronous receiver/transmitter (UART) bus. In embodiments, device 200 may be constructed with a small form factor and may have lateral dimensions of 1 cm×1.1 cm, for example, which may also include the lateral dimensions of its photovoltaic solar cell. In embodiments with such small form factors, device 200 may be referred to as a mote or a mote device, in recognition of the small form factor.

For purposes of illustration, the following description may relate to operation of monitoring device 200 in connection with an agricultural condition at an agricultural facility. It will be appreciated, however, that this description is similarly application to operation of monitoring device in connection with one or more other conditions at one or more other types of place. In the following description, monitoring device 200 may be operated to provide remote detection of an agricultural pest (e.g., an insect) at an agricultural location. Conventionally, detection of agricultural pests at an agricultural location may include placing at the location a pest trap, which may include a pheromone-impregnated adhesive-trap that may be species-specific, and periodic monitoring of the trap by in-person, on-site visual observation. Operation of monitoring device 200 may provide remote monitoring of any number of such traps without in-person, on-site visual observation. With such traps commonly being placed in numerous remote or disparate locations, operation of a monitoring device 200 at each location may significantly reduce the time, effort, and/or expense that may be required for in-person, on-site visual observation.

Figure 3:
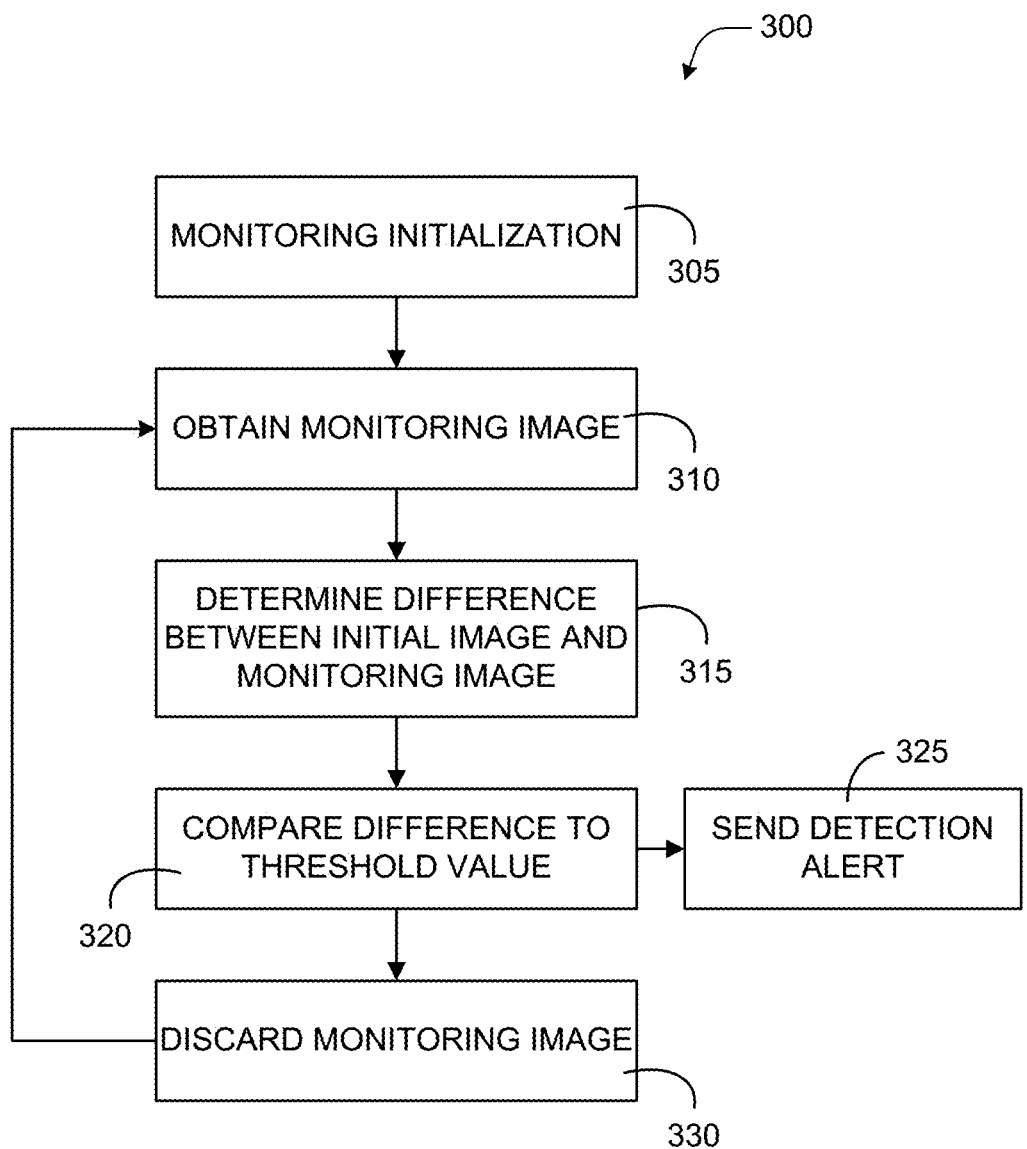
FIG. 3 is a flowchart illustrating an example process of monitoring a condition.

FIG. 3 is a flowchart 300 illustrating an example process of monitoring a condition. For illustrative purposes, the operations of process 300 will be described as being performed by monitoring device 200 (FIG. 2) as a network edge device. While particular examples and orders of operations are illustrated in FIG. 3, in various embodiments, these operations may be re-ordered, separated into additional operations, combined, or omitted altogether.

Figure 4A:
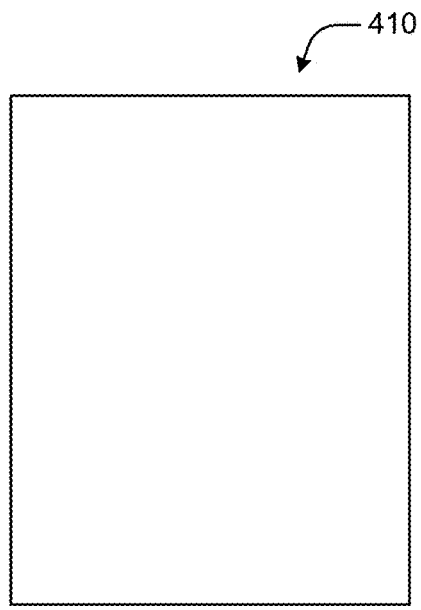
FIG. 4A is an example illustration of an initial image of a pest trap with no pests.

At 305, monitoring initialization may be performed. Monitoring initialization may include positioning camera 205 of device 200 to obtain an initial image of a condition such as, for example, presence of agricultural pests on a pest trap (e.g., a pheromone-impregnated adhesive sheet). The initial image may be of the pest trap before any pest is trapped thereon and may be stored in memory 210 on device 200. FIG. 4A is an example illustration of an initial image 410 of a pest trap with no pests. In embodiments, the initial image may be referred to as the ImageThreshold value (ITV), and may be based on and/or adjusted to accommodate historical data including lighting conditions, weather, dust, other insects in the season, etc. In other embodiments, the pheromone-impregnated adhesive-trap may be species-specific to one or more specific pest species.

At 310, a monitoring image may be obtained. For example, camera 205 of device 200 may obtain an image of the pest trap periodically (e.g., daily, or more or less often).

At 315, a difference between the initial image and the monitoring image may be determined. In an embodiment, the difference may be determined as a sum of per-pixel absolute difference in grayscale values, divided by the initial image, to determine a percentage change of image greyscale. For example, a percentage of change that may be referred to as current image threshold value (CTV) may be calculated as:

$$CTV=sum(abs(Image1(:)-Image2(:))>0)/numel(Image1);$$

with Image1 corresponding to pixel-by-pixel values of the initial image, Image2 corresponding to pixel-by-pixel values of the monitoring image, and numel(Image1) corresponding to the number of pixels in the initial image.

Figure 4B:
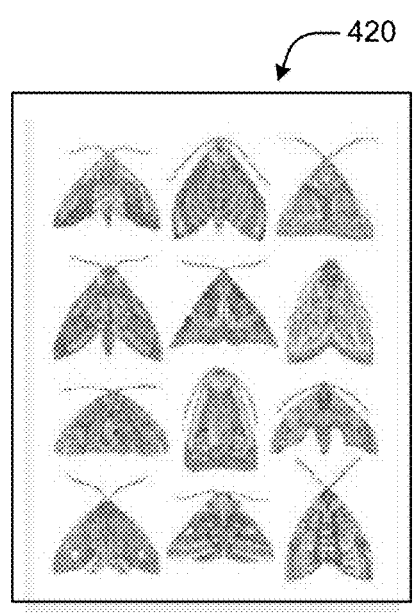
FIGS. 4B and 4C are example illustrations of monitoring images of a pest trap with different pest conditions.

At 320, the difference between the initial image and the monitoring image may be compared to a threshold value difference. If the difference is more than the threshold value difference, operation 320 may proceed to 325. If the difference is less than the threshold value difference, operation 320 may proceed to 330. A difference of more than the threshold value may correspond to at least a threshold infestation of the pest, and a difference of less than the threshold may correspond to a lesser infestation or absence of the pest. In one embodiment, a threshold value difference may be 30%, for example. FIG. 4B is an example illustration of a monitoring image 420 of a pest trap with pests corresponding to a difference between the initial image and the monitoring image of 0.49016, which corresponds to a difference of 49.016% and is greater than the threshold value difference may be 30%.

At 325, a detection alert is sent from monitoring device 200 to a destination on network 100. For example, the detection alert may be sent to a client device 105 and/or application server 115. In embodiments, the detection alert may not include the corresponding monitoring image 420 so as to minimize resource requirements. The detection alert may prompt an operator and/or a monitoring system at client device 105 and/or application server 115 to initiate action against the pest, which may include an in-person on-site inspection and/or pest mitigation. In embodiments, an operator and/or a monitoring system at client device 105 and/or application server 115 may seek confirming information about the pest infestation corresponding to the detection alert and may send device 200 a request for the monitoring image corresponding to the detection alert, and device 200 may send the monitoring image in response to the request.

Figure 4C:
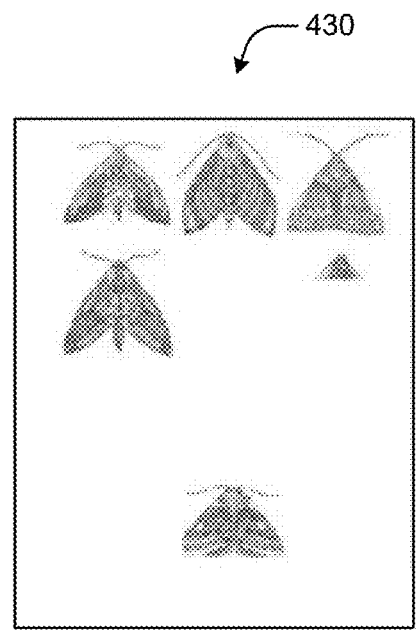

At 330, the monitoring image is discarded at monitoring device 200, and the operation returns to 310. FIG. 4C is an example illustration of a monitoring image 430 of a pest trap with pests corresponding to a difference between the initial image and the monitoring image of 0.22766, which corresponds to a difference of 22.766% and is less than the threshold value difference may be 30%.

A network edge device 200 may perform the operations of flowchart 300. In embodiments, processor 215 may execute instructions stored in memory 210 to perform operation s of flowchart 300. As a result, device 200 may be operated to obtain or capture a monitoring image of a condition proximal to the device at a location and to operate as an image threshold module to determine if the monitoring image exceeds a threshold relating to the condition at the location. A communication module, such as communication system 220, may communicate with a remote network location an indication or alert if the monitoring image exceeds the threshold relating to the condition.

Some non-limiting Examples are provided below.

Example 1 may include a network edge device that may comprise: one or more processors; a camera to be operated by at least one of the one or more processors to capture a monitoring image of a condition proximal to the device at a location; an image threshold module to be operated by at least one of the one or more processors to determine if the monitoring image exceeds a threshold relating to the condition at the location; and a communication module to communicate to a remote network location an indication if the monitoring image exceeds the threshold relating to the condition.

Example 2 may include the device of example 1, or any other example herein, wherein the image threshold module determines if the monitoring image exceeds the threshold relating to the condition at the location with a comparison of the monitoring image of the condition to a reference image of the condition.

Example 3 may include the device of example 2, or any other example herein, wherein the comparison of the monitoring image to the reference image includes a pixel-by-pixel determination of a difference between the monitoring image and the reference image.

Example 4 may include the device of any of examples 1-3, or any other example herein, wherein the indication the communication module communicates to the remote network location includes no transmission of an image from the device to the remote network location.

Example 5 may include the device of example 4, or any other example herein, wherein the communication module is to communicate to the network location the monitoring image in response to a request for the monitoring image from the remote network location after it receives the indication.

Example 6 may include the device of any of examples 1-3, or any other example herein, wherein the condition includes an agricultural pest condition at an agricultural facility.

Example 7 may include the device of example 6, or any other example herein, 6 further comprising one or more non-image environmental sensors to be operated by at least one of the one or more processors to receive environmental data on one or more environmental conditions at the location, and wherein the communication module is further to communicate the environmental data to the remote network location.

Example 8 may include the device of example 7, or any other example herein, wherein the environmental data may include one or more of air pressure, temperature, and humidity.

Example 9 may include the device of any of examples 1-3, or any other example herein, wherein the communication module employs wireless communication.

Example 10 may include the device of example 9, or any other example herein, wherein the wireless communication employs a Bluetooth low energy (BLE) communication format.

Example 11 may include the device of any of examples 1-3, or any other example herein, wherein the monitoring image is of an insect pest trap.

Example 12 may include the device of any of examples 1-3, or any other example herein, wherein the one or more processors includes a microcontroller.

Example 13 may include the device of any of examples 1-3, or any other example herein, wherein the condition includes foreign material at the location.

Example 14 may include the device of example 13, or any other example herein, wherein the foreign material includes dust on a surface at the location.

Example 15 may include a method that may comprise: obtaining with a network device a reference image of a condition at a location of the network device; periodically obtaining a monitoring image of the condition with the network device at the location; determining from comparison of the reference image and the monitoring image at the network device if the monitoring image includes more than a threshold of image change relating to the condition at the location; and upon determining that the monitoring image includes more than the threshold of image change relating to the condition at the location, communicating from the network device to a remote network location an alert that the monitoring image exceeds the threshold of image change relating to the condition, wherein the alert does not include the monitoring image.

Example 16 may include the method of example 15, or any other example herein, wherein the comparison of the monitoring image and the reference image includes a pixel-by-pixel determination of a difference between the monitoring image and the reference image.

Example 17 may include the method of example 16, or any other example herein, wherein the pixel-by-pixel determination of a difference between the monitoring image and the reference image includes pixel-by-pixel determination of a difference between a greyscale representation of the monitoring image and a greyscale representation of the reference image.

Example 18 may include the method of example 17, or any other example herein, and may further include communicating to the network location the monitoring image in response to a request for the monitoring image from the remote network location after it receives the alert.

Example 19 may include the method of example 15, or any other example herein, and may further comprise receiving environmental data on one or more environmental conditions at the network device and communicating the environmental data to the remote network location from the network device.

Example 20 may include the method of example 19, or any other example herein, wherein the environmental data may include one or more of air pressure, temperature, and humidity.

Example 21 may include the method of any of examples 15-20, or any other example herein, wherein communicating to the network location includes wireless communication.

Example 22 may include the method of any of examples 15-20, or any other example herein, wherein the condition includes an agricultural pest condition at an agricultural facility.

Example 23 may include the method of any of examples 15-20, or any other example herein, wherein the condition includes a foreign material at the location of the network device.

Example 24 may include at least one computer-readable medium including instructions to cause a network edge device, in response to execution of the instructions by the device, to: obtain a reference image of a condition at a location of the network edge device; periodically obtain a monitoring image of the condition at the location of the network edge device; periodically compare the monitoring image with the reference image to obtain image comparison results that indicate whether the condition at the location of the network edge device exceeds a condition threshold; and communicate to a network location comparison results that the condition at the location of the network edge device exceeds the condition threshold.

Example 25 may include the least one non-transitory computer-readable medium of example 24, or any other example herein, wherein instructions to periodically compare the monitoring image with the reference image includes instruction to determine a difference between the monitoring image and the reference image.

Example 26 may include the least one non-transitory computer-readable medium of example 24, or any other example herein, wherein the instructions to communicate the comparison results to the network location include instructions to communicate the monitoring image in response to a request for the monitoring image from the network location.

Example 27 may include the least one non-transitory computer-readable medium of any of examples 24-26, or any other example herein, and may further comprise instructions to obtain environmental data on one or more environmental conditions at the network edge device and communicate the environmental data to the network location.

Example 28 may include the least one non-transitory computer-readable medium of example 27, or any other example herein, wherein the environment data may include one or more of air pressure, temperature, and humidity.

Example 29 may include the least one non-transitory computer-readable medium of any of examples 24-26, or any other example herein, wherein the condition includes an agricultural pest condition at an agricultural facility.

Example 30 may include a network edge device, which may comprise: imaging means to capture a monitoring image of a condition proximal to the device at a location; image thresholding means to determine if the monitoring image exceeds a threshold relating to the condition at the location based on a comparison of the monitoring image of the condition to a reference image of the condition; and communication means to communicate to a remote network location an indication if the monitoring image exceeds the threshold relating to the condition.

Example 31 may include the device of example 30, or any other example herein, wherein the comparison of the monitoring image to the reference image includes a pixel-by-pixel determination of a difference between the monitoring image and the reference image.

Example 32 may include the device of examples 30 or 31, or any other example herein, wherein the indication the communication means communicates to the remote network location includes no transmission of an image from the device to the remote network location.

Example 33 may include the device of example 32, or any other example herein, wherein the communication means is to communicate to the network location the monitoring image in response to a request for the monitoring image from the remote network location after it receives the indication.

Example 34 may include the device of examples 30 or 31, or any other example herein, wherein the condition includes an agricultural pest condition at an agricultural facility.

Example 35 may include the device of example 34, or any other example herein, and may further comprise one or more non-image environmental sensor means to receive environmental data on one or more environmental conditions at the location, and wherein the communication means is further to communicate the environmental data to the remote network location.

Example 35 may include the device of example 36, or any other example herein, wherein the environmental data may include one or more of air pressure, temperature, and humidity.

Example 37 may include the device of examples 30 or 31, or any other example herein, wherein the communication means employs wireless communication.

Example 38 may include the device of example 37, or any other example herein, wherein the wireless communication employs a Bluetooth low energy (BLE) communication format.

Example 39 may include the device of example 30, or any other example herein, wherein the monitoring image is of an insect pest trap.

Example 40 may include the device of example 30, or any other example herein, wherein the condition includes foreign material at the location.

Example 41 may include the device of example 30, or any other example herein, wherein the foreign material includes dust on a surface at the location.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A network edge device for monitoring an agricultural location, comprising:
   one or more processors;
   a camera co-disposed with the one or more processors, and operated by at least one of the one or more processors to capture a monitoring image of a pest trap proximal to the device at the agricultural location;
   an image threshold module to be operated by at least one of the one or more processors to locally determine, at the agricultural location, whether the monitoring image of the pest trap exceeds a pixel based difference threshold relative to a provided reference image of the pest trap; and
   a communication module to communicate to a remote network location, via a wide area network, an indication if the monitoring image of the pest trap exceeds the pixel based difference threshold relative to the reference image of the pest trap;
   wherein the image threshold module determines whether the monitoring image of the pest trap exceeds the pixel based difference threshold relative to the reference image of the pest trap with a pixel-by-pixel absolute difference comparison of the monitoring image of the pest trap to the reference image of the pest trap.

2. The device of claim 1, wherein the pixel-by-pixel absolute difference comparison of the monitoring image of the pest trap to the reference image of the pest trap includes a pixel-by-pixel determination of an absolute difference between the monitoring image of the pest trap and the reference image of the pest trap, computation of a sum of the pixel-by-pixel absolute differences, and computation of a difference percentage via division of the sum by a number of pixels of the reference image of the pest trap.

3. The device of claim 1, wherein the indication the communication module communicates to the remote network location includes no transmission of a monitoring image of the pest trap from the device to the remote network location, when the monitoring image of the pest trap does not exceed the pixel based difference threshold relative to the reference image of the pest trap.

4. The device of claim 3, wherein the communication module is to communicate to the remote network location the monitoring image of the pest trap in response to a request for the monitoring image of the pest trap from the remote network location after the remote network location received the indication.

5. The device of claim 1, further comprising one or more non-image environmental sensors to be operated by at least one of the one or more processors to receive environmental data on one or more environmental conditions at the location, and wherein the communication module is further to communicate the environmental data to the remote network location.

6. The device of claim 1, wherein the communication module employs wireless communication.

7. The device of claim 6, wherein the wireless communication employs a Bluetooth low energy (BLE) communication format.

8. A method for monitoring an agricultural location, comprising:
   providing, to a network edge device disposed at the agricultural location, a reference image of a pest trap;
   obtaining a monitoring image of the pest trap with the network edge device at the agricultural location;
   locally determining, at the agricultural location, from a pixel-by-pixel absolute difference comparison of the reference image of the pest trap and the monitoring image of the pest trap at the network edge device, whether the monitoring image of the pest trap includes more than a pixel based difference threshold of image change relative to the reference image of the pest trap; and
   upon determining that the monitoring image of the pest trap includes more than the pixel based difference threshold of image change relative to the reference image of the pest trap, communicating from the network edge device to a remote network location, via a wide area network, an alert that the monitoring image of the pest trap exceeds the pixel based difference threshold of image change relative to the reference image of the pest trap, wherein the alert does not include the monitoring image of the pest trap.

9. The method of claim 8, further comprising receiving environmental data on one or more environmental conditions at the network edge device and communicating the environmental data to the remote network location from the network edge device.

10. The method of claim 8, wherein the pixel-by-pixel absolute difference comparison of the monitoring image of the pest trap to the reference image of the pest trap includes a pixel-by-pixel determination of an absolute difference between the monitoring image of the pest trap and the reference image of the pest trap, computation of a sum of the pixel-by-pixel absolute differences, and computation of a difference percentage via division of the sum by a number of pixels of the reference image of the pest trap.

11. At least one computer-readable medium including instructions to cause a network edge device disposed at an agricultural location, in response to execution of the instructions by the network edge device, to:
   receive a reference image of a pest trap proximal to the agricultural location of the network edge device;
   periodically obtain a monitoring image of the pest trap proximal to the agricultural location of the network edge device;
   compare each of the obtained monitoring image of the pest trap with the reference image of the pest trap to obtain a corresponding pixel-by-pixel absolute difference comparison result that indicates whether a pixel based difference threshold is exceeded; and
   communicate to a remote location, via a wide area network, when a comparison result exceeds the pixel based difference threshold.

12. The least one non-transitory computer-readable medium of claim 11, wherein to communicate includes to communicate without initially providing the monitoring image having the comparison result that exceeded the pixel based difference threshold, and to subsequently communicate the monitoring image having the comparison result that exceeded the pixel based difference threshold, in response to a subsequent request for the monitoring image having the comparison result that exceeded the pixel based difference threshold from a network location.

13. The least one non-transitory computer-readable medium of claim 11 further comprising instructions to obtain environmental data on one or more environmental conditions at the network edge device, and communicate the environmental data to the network location.

14. The least one non-transitory computer-readable medium of claim 13, wherein the environment data may include one or more of air pressure, temperature, and humidity.

15. The least one non-transitory computer-readable medium of claim 11, wherein to compare the obtained monitoring image of the pest trap with the reference image of the pest trap further includes to compute a sum of the pixel-by-pixel absolute differences, and compute a difference percentage via division of the sum by a number of pixels of the reference image of the pest trap.

* * * * *